Nov. 23, 1971     O. M. ULBING     3,621,756

LOAD BALANCER

Filed May 20, 1969

INVENTOR
OTMAR M. ULBING
BY
David W. Tibbott
ATTORNEY

United States Patent Office 3,621,756
Patented Nov. 23, 1971

---

3,621,756
LOAD BALANCER
Otmar M. Ulbing, Berkshire, N.Y., assignor to Ingersoll-Rand Company, New York, N.Y.
Filed May 20, 1969, Ser. No. 826,253
Int. Cl. F15b *15/26;* F01b *15/00*
U.S. Cl. 91—43
3 Claims

ABSTRACT OF THE DISCLOSURE

A load balancer adapted to be suspended from a hoist and to support a load in a floating balanced manner. The load balancer contains a pneumatic chamber and a valve means for automatically admitting pneumatic pressure into and exhausting it from the chamber to automatically maintain the balancer piston in a position relative to the chamber intermediate the ends of its travel stroke. A brake grips the piston to restrict its speed of travel to prevent its oscillation and this brake grips the piston progressively tighter as the pressure in the pneumatic chamber increases.

BACKGROUND OF INVENTION

This invention relates to a load balancer of the type that can provide a lifting force balancing a load whereby the load floats on the balancer and can be raised or lowered by the application of a relatively small force to the load.

In certain applications of raising or lowering loads with a hoist, it is difficult to stop a load at an exact location using the power of the hoist. Frequently, the hoist either stops short or runs past the desired location and it is difficult to operate the hoist to move only small amounts.

SUMMARY OF INVENTION

The principal object of this invention is to provide a load balancing device which can be supported from a hoist or other lifting device and will automatically balance a load in a floating manner so that the load can be manually moved up or down by the use of very little force.

Other important objects are: to provide a load balancer which automatically adjusts itself to balance loads of various weights and automatically balances such loads at intermediate points in its travel stroke; and to provide a load balancer having a brake which automatically adjusts itself to the load on the balancer to prevent the balancer from unduly oscillating up and down during its operation.

In general, the foregoing objects are attained in a device having a piston member slidably mounted in a cylinder member for travel over a given stroke relative to the cylinder. One of the members can be suspended from a support, such as a hoist, and the other is adapted to support a load. The two members are arranged to cooperatively form a pneumatic chamber for containing pressure acting to lift the load. Automatic valve means is provided for admitting pneumatic pressure into and exhausting it from the pneumatic chamber to maintain the piston member at a variable location relative to the cylinder intermediate the opposite ends of the travel stroke of the piston member. Automatic brake means restricts the movement of the piston member in the cylinder member to prevent the load from oscillating up and down and this brake means becomes more effective as the load weight increases.

BRIEF DESCRIPTION OF DRAWING

The invention is described in connection with the accompany drawing wherein.

DESCRIPTION OF PREFERRED EMBODIMENT

Figure 1:
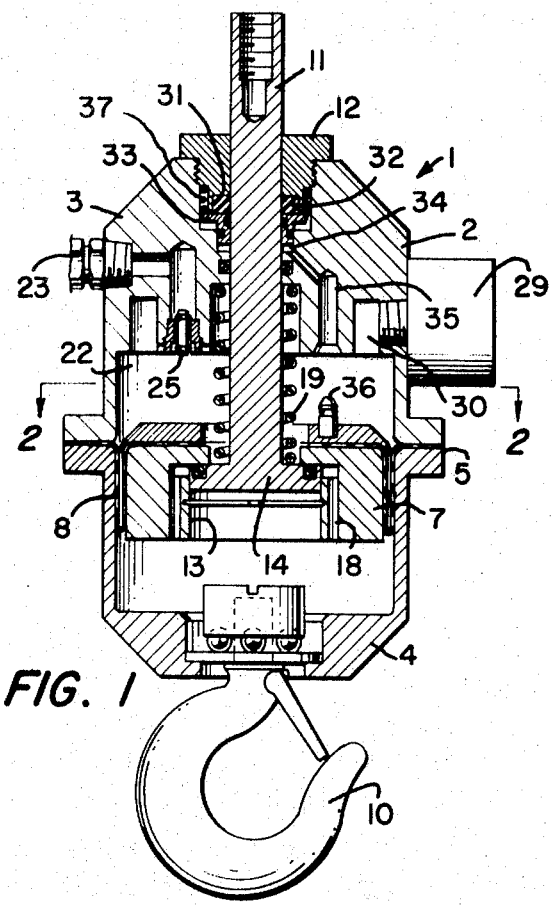
FIG. 1 is a vertical section of a balancing device made in accordance with this invention.
Figure 2:
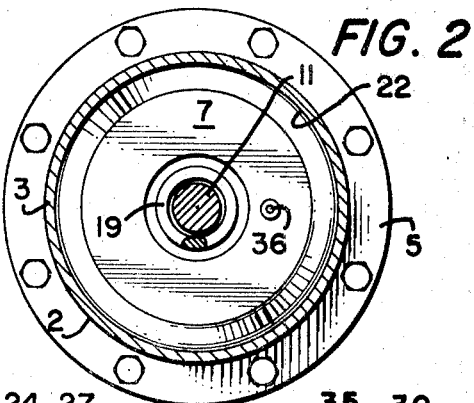
FIG. 2 is a section taken on the line 2—2 in FIG. 1.
Figure 4:
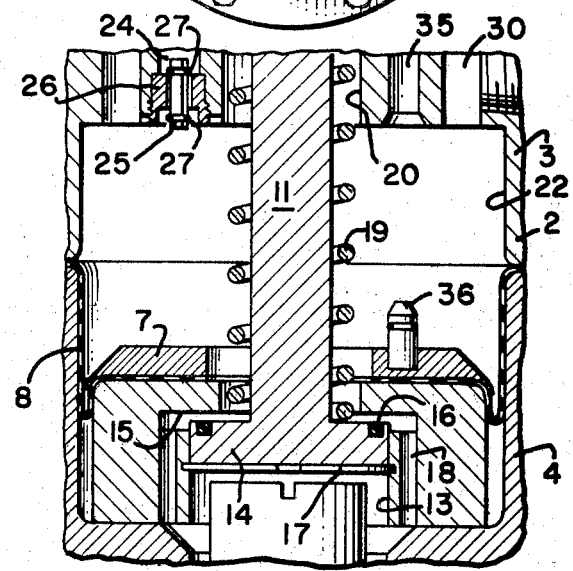
FIG. 4 is an enlarged fragment of FIG. 1 showing the piston at the end of its relative stroke wherein pneumatic pressure is being exhausted from the balancer.

The load balancer 1 includes a cylinder 2 comprising upper and lower portions 3 and 4 which are joined along a circular midjoint 5. The interior of the cylinder 2 is hollow and contains a sliding piston 7 connected to the cylinder by a rolling diaphragm 8. The piston 7 is formed of two parts to grip the inner edges of the diaphragm 8 between the two parts and the outer edges of the diaphragm are clamped in the joint 5. A conventional hoist hook 10 is rotatably mounted in the lower portion 4 of the cylinder 2 in a manner allowing free flow of air between the inside of the cylinder 2 and the outside atmosphere through the connection of the hook 10 to the cylinder 2.

A piston rod 11 extends slidably through a nut 12, threaded into the the top of the upper portion 3 of the cylinder 2, and through a central opening 13 in the piston 7. The upper end of the piston rod 11 is adapted to be suspended from a support such as a hoist (not shown). The piston rod 11 carries an integral head 14 seating beneath an internal shoulder 15 surrounding the opening 13 in the piston 7. The head 14 carries an annular seal 16 seating on the shoulder 15 and is locked in the piston 7 by a lock ring 17 located in the opening 13 below the head 14. The lock ring 17 is spaced below the head 14 allowing the head a limited amount of movement in the piston 7. The shoulder 15 is interconnected to the bottom of the piston 7 by vent ports 18 located around the opening 13 for venting pressure from the top of the piston 7 when the head 14 is unseated from the shoulder 15. The piston rod 11 is urged downwardly by a spring 19 interposed between the head 14 and a cup-shaped cavity 20 located in the upper portion 3 of the cylinder 2.

The top face of the piston 7 cooperates with the internal walls of the cylinder 2 to form a closed pneumatic chamber 22 above the piston 7. Pneumatic pressure is supplied to the pneumatic chamber 22 through a hose 23 connected to an inlet passage 24 formed in the upper cylinder portion 3. An automatic admission valve 25 is mounted in the passage 24 and includes a sleeve 26 and a sliding spool, also designated 25, having O-rings 27 located at both ends. Normally, the valve 25 acts as a check valve to prevent pressure in the hose 23 from entering the chamber 22 until the piston 7 engages the valve 25 and unseats it, which only occurs with the piston 7 at the upper end of its stroke.

A container 29 is attached to the side of the cylinder 2 and connects to the chamber 22 through a communicating passage 30. The purpose of the container is to serve as a plenum chamber to increase the effective volume of the pneumatic chamber 22.

A brake ring 32 of resilient friction material surrounds the piston rod 11 at the bottom of the nut 12. The brake ring 32 is located in an annular rabbet 31 provided in the bottom face of the nut 12. A brake piston 33 engages the bottom face of the brake ring 32 and is slidably mounted within a brake space 34 provided in the cylinder upper portion 3. The brake space 34 is connected to the pneumatic chamber 22 by a brake passage 35. Pressure in the pneumatic chamber 22 acts on the brake piston 33 to squeeze the brake ring 32 into braking engagement with the piston rod 11 causing it to grip the piston rod 11 to restrict and retard the sliding movement of the piston rod 11. The reason for the brake ring 32 is to minimize the oscillation of the piston rod 11 under certain conditions. The braking effect of the brake ring 32 increases progressively as the pressure in the pneumatic chamber 22 rises, since a rise in pressure increases the squeezing force applied to the brake ring 32. The piston 7 carries a plug 36 adapted to enter and close the brake passage 35 when the piston 7 nears the top of its travel. A small spring 37 urges the brake piston 33 downwardly to release the brake ring 32 when the pressure is removed.

Figure 5:
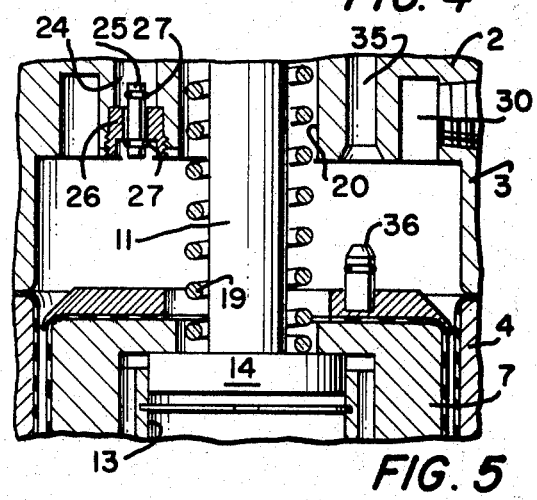
FIG. 5 is a view similar to FIGS. 3 and 4 and showing the automatic inlet valve acting as a check valve to trap pneumatic pressure within the balancer when the pressure within the supply hose has failed.
Figure 3:
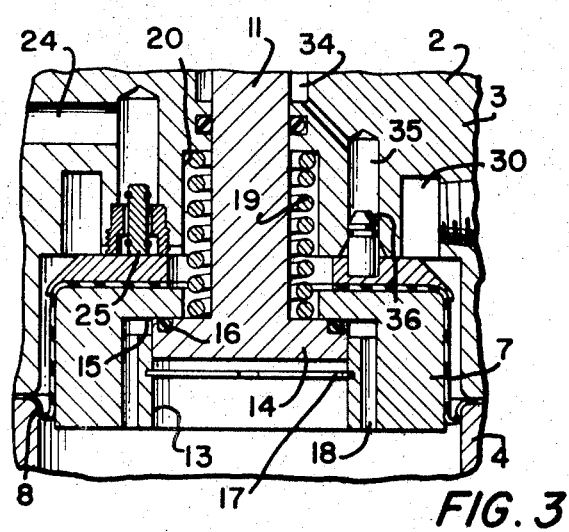
FIG. 3 is an enlarged fragment of FIG. 1 showing the piston at one end of its relative stroke with pneumatic pressure being admitted into the balancer.

In the event that pressure is suddenly released from the hose 23, such as would happen if the hose 23 should break, the admission valve 25 will automatically move to the position shown in FIG. 5, thus trapping pressure within the pneumatic chamber 22. This position of the valve 25 is the natural result of the pressure in the hose 23 being lower than in the pneumatic chamber 22.

The strength of the spring 19 is selected to balance the weight of the balancer 1 when unloaded. In other words, the spring 19 will maintain the piston 7 generally near the middle of its travel stroke relative to the cylinder, the position shown in FIG. 1.

OPERATION

When unloaded, the pressure in the pneumatic chamber 22 is substantially zero. At the start of the description of the operation, it is assumed that the upper end of the piston rod 11 is connected to the cable of a hoist (not shown) and that there is no load on the balancer 1. In speaking of the piston 7 as moving, it is intended to refer to the relative movement of the piston 7 in the cylinder 2.

Initially, the hoist is operated to lower the balancer 1 to a position where the hook 10 can be connected to a load. Thereafter, the load is lifted and moved to a position approximately in the vicinity of the desired position of the load. Thereafter, the balancer 1 is manually used to move the load into its desired position.

As the load is initially lifted by the balancer 1, the increase in weight on the hook 10 will force the cylinder 2 downward against the piston 7. As the piston 7 nears the top of its travel stroke, relative to the cylinder, it engages and opens the valve 25 allowing pneumatic pressure from the hose 23 to flow into the pneumatic chamber 22. Simultaneously the plug 36 is closing the brake passage 35 preventing the increase in pneumatic pressure in the chamber 22 from initially acting on the brake piston 33. Hence, the brake initially allows the piston rod 11 to slide freely since the pressure in the brake space 34 is low at this time.

As the pneumatic pressure enters the chamber 22 it forces the piston 7 downwardly relative to the cylinder to approximately the middle of its travel stroke, the position shown in FIG. 1. As the piston 7 moves relatively away from the valve 25, the valve 25 automatically closes to prevent pneumatic pressure from further entering the chamber 22. Even though the valve 25 is closed soon after the piston 7 begins moving relatively downward, sufficient pressure will enter the chamber 22 to force the piston 7 to about the middle of its stroke. When the plug 36 opens the brake passage 35, the increased pneumatic pressure in the chamber 22 acts on the brake piston 33 causing the brake ring 32 to frictionally retard the movement of the piston rod 11. Preventing the piston rod from moving freely relative to the cylinder minimizes the oscillation of the piston rod in the cylinder 2 as the piston 7 stops moving downward near the middle of its stroke, as shown in FIG. 1. Without the braking action of the brake ring 32, the balancing system would act as an undamped spring causing the hook to oscillate up and down for a period of time which would be undesirable.

With the balancer 1 balancing the load on the hook 10, after the hoist moves the load into the vicinity of its desired position and stops, an operator can manually move the load into its final position by applying small amounts of force to the load to move it up and down over the relatively short travel stroke of the balancer 1. In this way, the load can be easily moved into its final position without the risk of damaging either the load or the structure surrounding the load, which might otherwise occur if the hoist were used to move the load into its final position. As the load is moved up and down over short distances, the pneumatic pressure in the chamber 22 allows the load to be moved yieldably while the operator applies relatively small amounts of force to the load.

When it is desired to unhook the load, the hoist is operated to lower the balancer 1 and the pressure in the chamber 22 will force the piston 7 to move relatively and approach the bottom of its travel stroke. When the piston 7 reaches the bottom of its stroke, the head 14 is unseated from the shoulder 15 allowing the pneumatic pressure in the chamber 22 to be vented through the vent ports 18. This will automatically relieve the pressure in the chamber 22 allowing the piston to move relatively upward to about the middle of its stroke. Thereafter, the balancing device is ready for use in lifting additional loads.

This description of the operation of the balancer 1 makes it clear that the valve system for the balancer 1 automatically admits pneumatic pressure into and exhausts it from the pneumatic chamber to automatically maintain the piston 7 in a position intermediate the ends of its travel stroke.

Although a single embodiment of the invention is illustrated and described in detail, this invention is not limited merely to this embodiment, but contemplates other embodiments and variations which utilize the concepts and teachings of this invention.

I claim:

1. A load balancer adapted to be connected to a source of air pressure and for resiliently supporting a load whereby it can be readily moved up or down comprising:
   a cylinder member;
   a piston member slidably mounted within said cylinder member and reciprocable relative to said cylinder member over a given travel stroke;
   one of said members adapted to be suspended from a support and the other member adapted to suspend a load;
   said members being arranged to form a pneumatic chamber adapted to contain air pressure acting to lift said load; and
   automatic valve means contained within said cylinder member for admitting and exhausting air pressure into and from said pneumatic chamber in a manner to maintain said piston member at a variable location intermediate the opposite ends of the travel stroke of said piston member;
   said automatic valve means being operative to automatically admit air pressure to said pneumatic chamber when said piston member reaches one end of its travel stroke, to exhaust air pressure from said pneumatic chamber when said piston member reaches the other end of its travel stroke and to remain closed thus preventing either the admission of air into or the exhaust of air from said chamber whenever said piston is intermediate the ends of its travel stroke.

2. The load balancer of claim 1 wherein: said one end of the travel stroke of said piston member corresponds to the lower end of the travel of the load with said other member.

3. The load balancer of claim 3 including: brake means for automatically braking the movement of said piston member in said cylinder member when said piston member is in an intermediate part of its travel stroke and a load is being carried by said other member.

References Cited

UNITED STATES PATENTS

| | | | |
|---|---|---|---|
| 599,618 | 2/1898 | Mason | 91—390 |
| 646,458 | 4/1900 | Pedrick | 91—390 |
| 3,282,283 | 11/1966 | Takeda | 91—390 |
| 3,428,298 | 2/1969 | Powell | 91—390 |
| 1,506,219 | 8/1924 | Clark | 91—216 B |

FOREIGN PATENTS

| | | | |
|---|---|---|---|
| 180,050 | 7/1962 | Sweden | 91—390 |

PAUL E. MASLOUSKY, Primary Examiner

U.S. Cl. X.R.

91—216, 390